Patented Sept. 3, 1929.

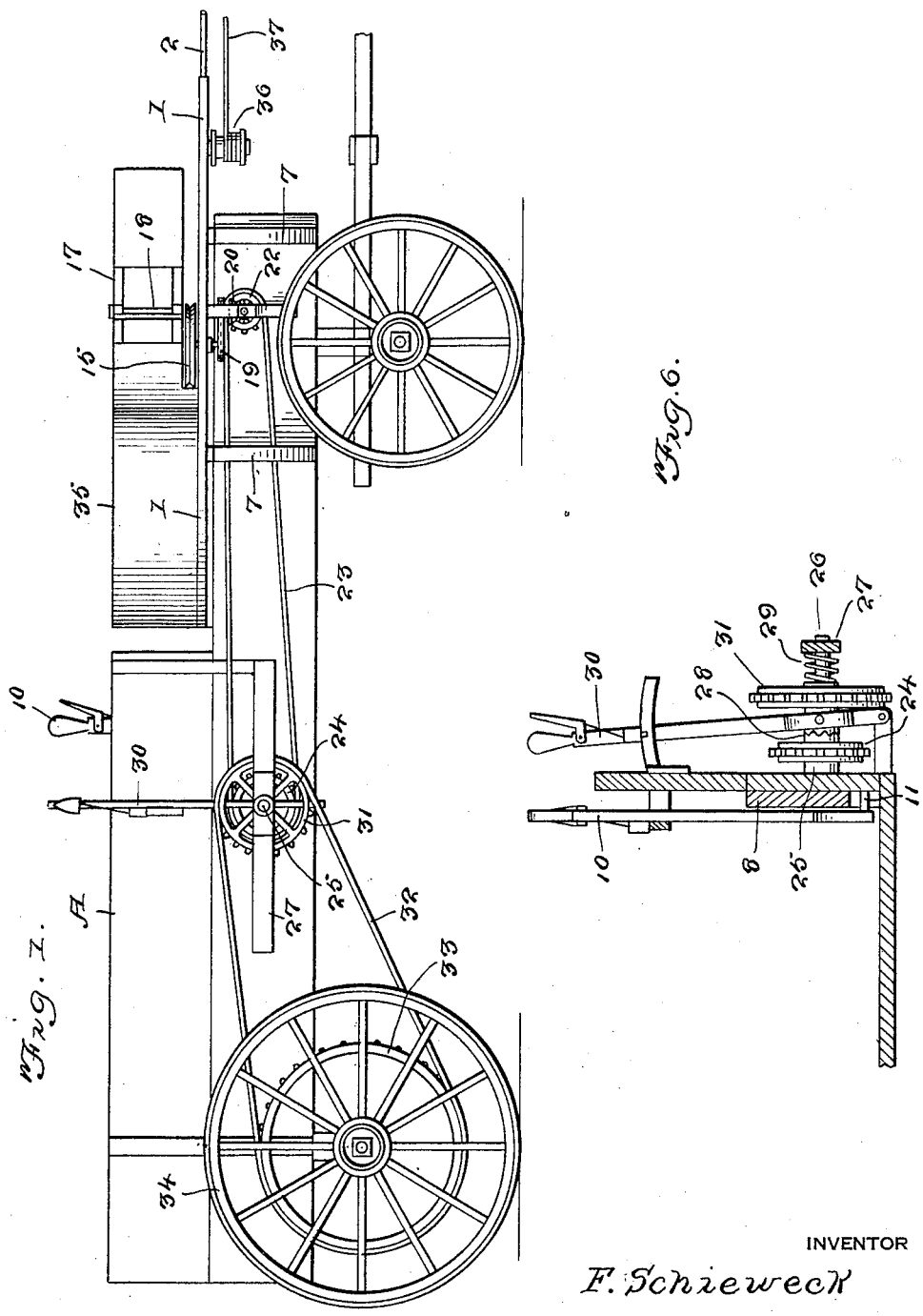

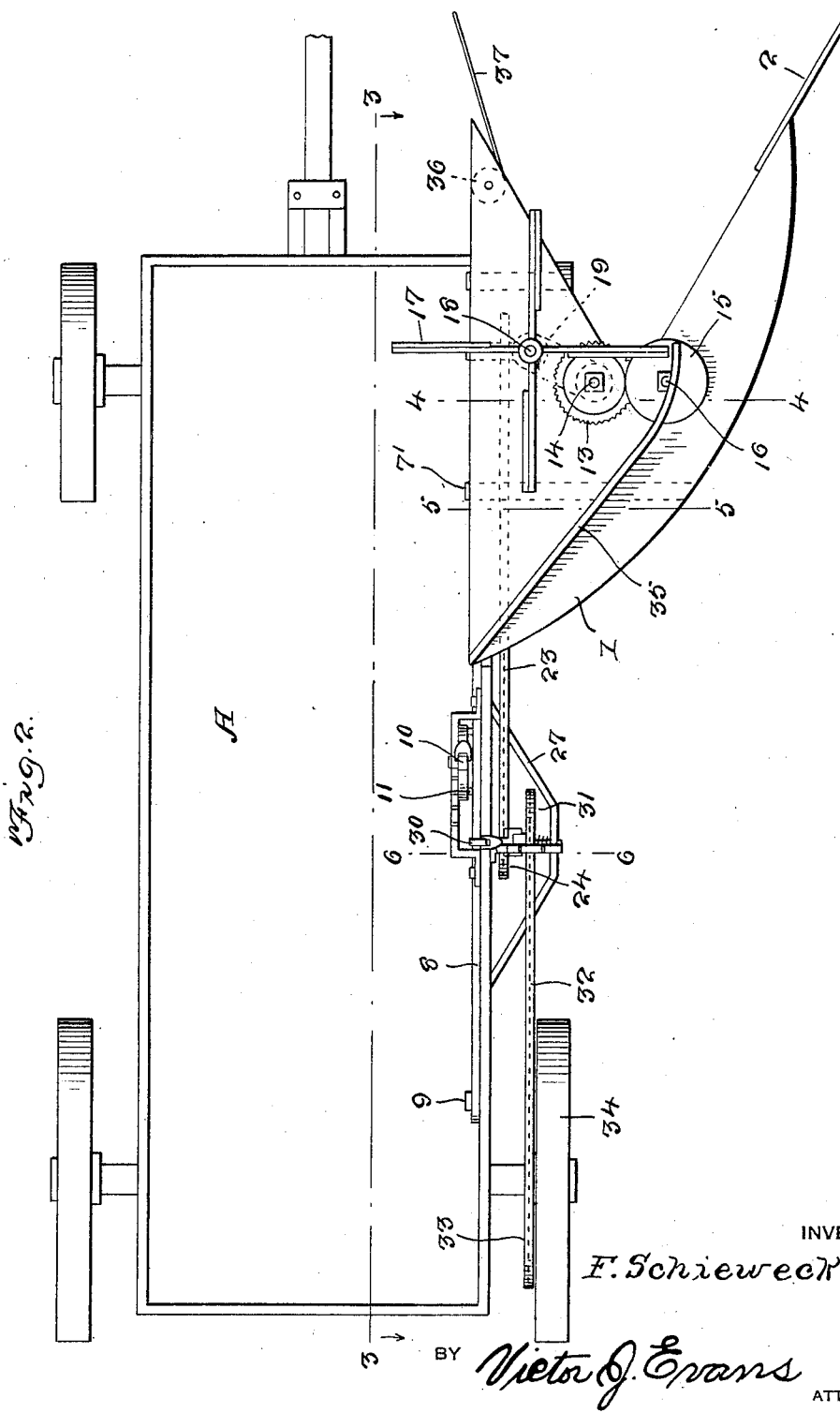

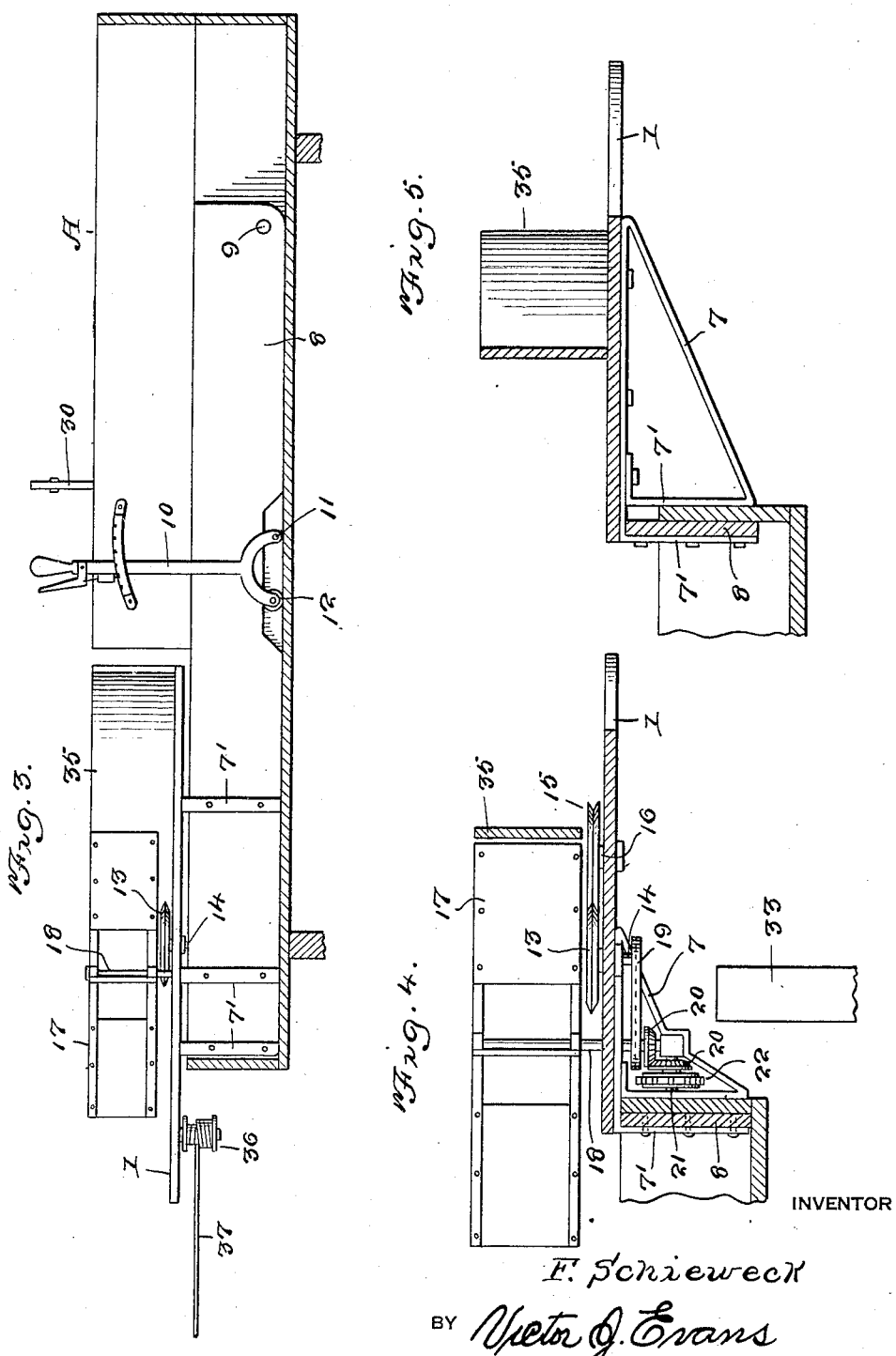

1,727,220

UNITED STATES PATENT OFFICE.

FRITZ SCHIEWECK, OF HUNTINGDON, TENNESSEE.

HARVESTER.

Application filed December 22, 1925. Serial No. 77,054.

This invention relates to a harvester or header, the general object of the invention being to provide an attachment for a wagon or other vehicle which is provided with cutting means, operable from one of the vehicle wheels for cutting the heads off of Kaffir corn and the like, with means for depositing the heads in the wagon body.

Another object of the invention is to provide means for adjusting the attachment on the body so that it can be adjusted to cut the heads off stalks of varying heights.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation of a wagon showing the invention in use.

Figure 2 is a plan view of Figure 1.

Figure 3 is a section on line 3—3 of Figure 2.

Figure 4 is a section on line 4—4 of Figure 2.

Figure 5 is a section on line 5—5 of Figure 2.

Figure 6 is a section on line 6—6 of Figure 2.

In these views, 1 indicates the platform of the device which is provided with a V-shaped recess in its front for receiving the stalks to be cut, the sloping walls of the recess guiding the stalks to the cutting means. One wall of the recess can be extended by the strip 2, if necessary or desired. This platform is fastened to the brackets 7 which are each formed with a pair of depending parts 7', one of which is fastened to a vertically arranged plank 8 which engages the inner face of one of the side pieces of the vehicle body A and has its rear end pivoted thereto, as shown at 9. The outer parts 7' of the brackets engage the outer face of the side piece so that the side piece is clamped between the plank 8 and the outer parts 7' of the brackets. By moving the plank 8 on its pivot by means of the hand lever 10 which has one prong of its forked lower end pivoted to the side piece, as shown at 11 and having a roller 12 on its other prong for engaging a part of the plank, the platform can be adjusted as to its distance from the ground so that the device can be made to cut heads from stalks of varying heights.

A cutter disk 13 is fastened to the upper end of a vertically disposed shaft 14 journaled in the platform and a grooved cutter disk 15 is connected with the upper end of a stub shaft 16 journaled in the platform. These disks are located adjacent the small end of the recess and are arranged to cut the heads off stalks guided to them by the sloping walls of the recess as the wagon is drawn along the rows of plants. I also provide a reel 17 for bringing the stalks against the cutting means and for knocking the heads on to the platform, in rear of the cutters and for moving them from the platform into the body. This reel is mounted on a vertically arranged shaft 18 journaled in the platform and one of the brackets and this shaft 18 is connected by the chain and sprockets 19 with shaft 14 so that the cutter disks will be rotated from the shaft 18. This shaft 18 is connected by the beveled gears 20 with a horizontally arranged stub shaft 21 journaled in one of the brackets and which is provided with a sprocket 22, over which a chain 23 passes, said chain also passing over a sprocket 24 on a shaft 25 rotatably mounted on a shaft 26 carried by the bracket 27 which is attached to the side of the body. Shaft 25 is provided with clutch teeth which are engaged by a clutch part 28 slidably mounted on shaft 26 and normally held in engagement with the teeth by the spring 29 on said shaft 26. A clutch lever 30, carried by the body, is provided for shifting the part 28. This part also carries a sprocket 31 which is connected by a chain 32 with a ring gear 33 attached to one of the wheels 34 of the vehicle, so that the clutch part will be rotated when the vehicle is traveling along and by throwing the clutch part into engagement with the teeth on shaft 25, this movement will be transmitted to the cutting disks and to the reel through means of the connections shown.

A guide plate 35 is mounted on the platform which cooperates with the reel to cause the heads to pass into the body after leaving the cutting disks. A spring drum 36 is arranged on the front part of the platform and has a cable 37 attached thereto, so that the platform can be attached to a part of the harness of the team.

From the foregoing, it will be seen that I have provided an attachment for a wagon box whereby the wagon can be used for cutting heads off of Kaffir corn and the like, with means for depositing the severed heads into the box so that headed plants can be harvested very quickly and with but little expense. The sloping walls at the front of the platform direct the stalks to the cutting disks, these disks severing the heads from the stalks and then the heads are struck by the arms of the reel which moves them across the platform and causes them to drop into the box. By actuating the clutch lever, the cutting means can be thrown out of operation whenever desired and by manipulating the lever 10, the platform with the cutting means thereon can be adjusted to cut stalks of varying heights. The device can easily be moved from the box or body by removing the pivot pin and one of the chains and lifting the entire device off the body.

I prefer to make the cutters with saw teeth, as shown, so as to increase their cutting effect, and permit them to cut heavy stalks. If desired, only one of the cutters may be provided with cutting teeth, the other having a plain cutting edge.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A header attachment for a vehicle comprising a platform having a V-shaped recess in its front end, the walls of which form guiding means, cutting means mounted on the platform and located at the inner end of the recess, a vertically arranged shaft journaled in the platform, horizontally extending arms connected with the upper end of the shaft and forming with the shaft a reel for bringing the heads of the stalks of grain entering the recess against the cutting means and for moving the severed heads over the platform into the vehicle, a curved guide plate on the platform which cooperates with the reel to cause the heads to pass into the vehicle, said plate being arranged in rear of the cutting means and means for operating the cutting means and the shaft of the reel from one of the ground wheels of the vehicle.

In testimony whereof I affix my signature.

FRITZ SCHIEWECK.